United States Patent [19]
Trunnell

[11] 3,800,820
[45] Apr. 2, 1974

[54] IRRIGATION PIPE MOVER

[76] Inventor: Harold K. Trunnell, 3520 Knob Hill Ln., Eugene, Oreg. 97405

[22] Filed: June 14, 1972

[21] Appl. No.: 262,701

[52] U.S. Cl. ............. 137/344, 214/1 PA, 239/212
[51] Int. Cl. ............................................. B05b 9/02
[58] Field of Search..... 180/49; 214/1 PA; 239/212, 239/177; 137/344

[56] References Cited
UNITED STATES PATENTS

| | | | |
|---|---|---|---|
| 3,318,531 | 5/1967 | Funk | 239/177 X |
| 3,298,453 | 1/1967 | Bobard | 180/21 |
| 3,503,556 | 3/1970 | Moulton | 239/212 |
| 2,892,466 | 6/1959 | Stilwell et al. | 239/212 X |
| 3,545,478 | 12/1970 | Etgen | 137/344 |
| 3,653,400 | 4/1972 | Coates | 137/344 |

*Primary Examiner*—Frank E. Werner
*Attorney, Agent, or Firm*—Kolisch, Hartwell & Dickenson

[57] ABSTRACT

Improved apparatus for laterally moving an elongated expanse of irrigation composition An engine powering the apparatus is supported to one side of and below the level of an elongated beam member which extends transversely of the pipe and is supported for movement along the ground. In a preferred embodiment, a hydraulic pump driven by the engine, and a control valve for the pump are mounted adjacent the engine and on a common bracket. The disclosed mounting arrangement provides increased operator safety, and improved power and operating convenience.

12 Claims, 5 Drawing Figures

PATENTED APR 2 1974  3,800,820

IRRIGATION PIPE MOVER

BACKGROUND AND SUMMARY OF THE INVENTION

The invention relates to apparatus for laterally moving an elongated expanse of pipe, and in particular to such apparatus for use in an irrigation system.

More specifically, the invention relates to a self-propelled side roll mover for irrigation pipe affording improved safety, performance, and ease of operation.

Irrigation systems of a type employing elongated expanses of pipe, supported above the ground on wheel structures, are well known. A typical system includes multiple aluminum pipe sections disposed end-to-end and coupled together to produce a continuous expanse of pipe. Wheel structures, provided at intervals along the length of the pipe, support it and allow the pipe to be moved laterally by rolling the wheel structures over the ground.

Power for moving such a system may be provided by a self-propelled, wheel-driven apparatus referred to hereinafter as a "mover". Typically the mover includes one or more frame members extending transversely of the irrigation pipe and supported at either end by wheel structures similar to those used to support the expanse of pipe. Mounted on the frame member is a power source, normally a small gasoline engine, which is coupled through a power transmission system to both the mover's wheels and the irrigation pipe. To reposition an expanse of pipe in a field being irrigated, the mover's engine is started and power applied to the mover's wheels, and at the same time to the pipe, which is coupled so that it rotates axially. The rotating pipe transmits torque to the wheel structures supporting the pipe at locations remote from the mover, causing them to roll along the ground in step with the mover. Since the expanse of pipe is, in effect, rolling sideways while being so moved, such a system is called a "side roll system", and the mover, accordingly, a "side roll mover".

Several problems have been experienced with the design and construction of known movers. One conventional side roll mover consists of a pair of wheel-bearing axles connected at their midpoints by an elongated hollow beam. Mounted on this beam are an engine and an associated power transmission system including a hydraulic pump coupled to the engine, a control valve for the pump, and hydraulic motors in engagement with a bull gear forming part of the mechanical means transmitting power to the wheel structures of the mover.

When the mover is being operated to reposition the pipe, an operator must stand next to the beam near the engine and control valve. This necessarily places him close to drive chains in the mover linking drive gears driven by the bull gear to wheels in the mover, and almost directly in front of a wheel, a potentially hazardous location. In addition, since the wheels used range in diameter from about 60 to about 80 inches typically, the engine and related equipment mounted on the beam obstructs the view of an operator standing near the engine, and prevents him from viewing the expanse of irrigation pipe as it is being moved.

In addition to its other functions, the hollow beam serves as a hydraulic fluid reservoir for the beam-mounted pump. However, when the intake of the pump is above the level of the fluid in the beam, as is normally the case with this prior art design, certain problems are introduced such as cavitation in the hydraulic fluid, loss of pump power, etc.

A general object of the instant invention, therefore, is to provide an improved side roll mover which obviates many of the drawbacks characterizing currently known movers.

More specifically, it is an object of the invention to provide a mover in which the operating controls are positioned in such a manner as to reduce the possibility of injury to an operator.

It is a further object to provide a mover having the engine mounted so that an operator's view of the irrigation system is not obstructed.

Still another object of the invention is to provide a mover having greater operating drive power.

Yet another object is to provide an organization wherein the engine is readily started by an operator located on either side of the irrigation pipe moved by the mover.

Accordingly, a mover is provided in which the engine, pump, and control valve are supported to one side of and below the level of the beam. In a preferred embodiment of the invention, these components are mounted on a common bracket which is secured to the beam, and which includes a platform portion supporting the underside of the engine below the level of and to one side of the beam, a mounting portion supporting the pump so that its intake is below the top of the beam, and a flange portion supporting the control valve adjacent the side of the engine remote from the beam.

BRIEF DESCRIPTION OF THE DRAWINGS

These and other objects and advantages of the novel side roll mover of the invention will become more apparent as the description which follows is read in conjunction with the accompanying drawings, wherein.

DETAILED DESCRIPTION OF THE INVENTION

Figure 1:
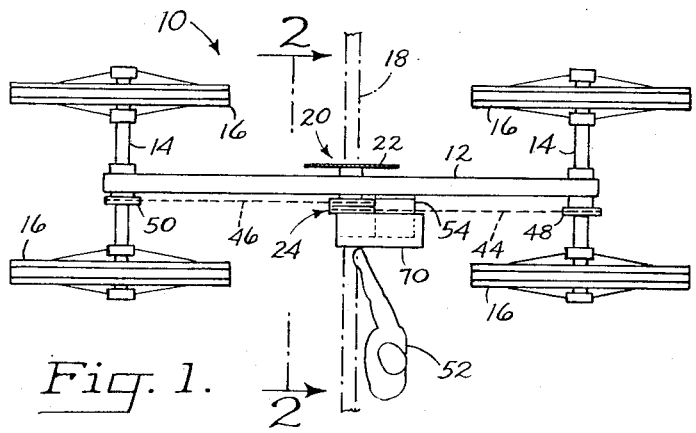
FIG. 1 is a simplified plan view of a side roll mover according to the invention, showing an operator in position to control the mover.
Figure 2:
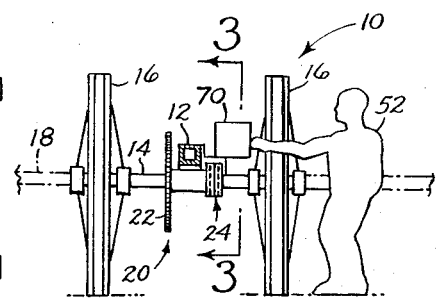
FIG. 2 is a simplified end view taken along plane 2—2 of FIG. 1.

Turning now to the drawings, and referring first to FIGS. 1 and 2, indicated generally at 10 is a side roll mover according to the invention. Mover 10 includes an elongated hollow beam 12, supported for movement along the ground by axles 14 and wheels 16, which together form ground-traversing support means. When, as shown in FIG. 1, mover 10 is in position for laterally moving an expanse of irrigation pipe 18, beam 12 extends transversely over the pipe, with pipe 18 passing through gear assembly 20. Assembly 20, which includes a bull gear 22 and drive gears 24, is journaled adjacent the midregion of beam 12 by suitable supporting structure (not shown) secured to the bottom of the beam. The pipe is connected to the gear assembly, in a manner known in the art, whereby on rotation of the bull gear, the pipe is rotated about its axis.

Figure 3:
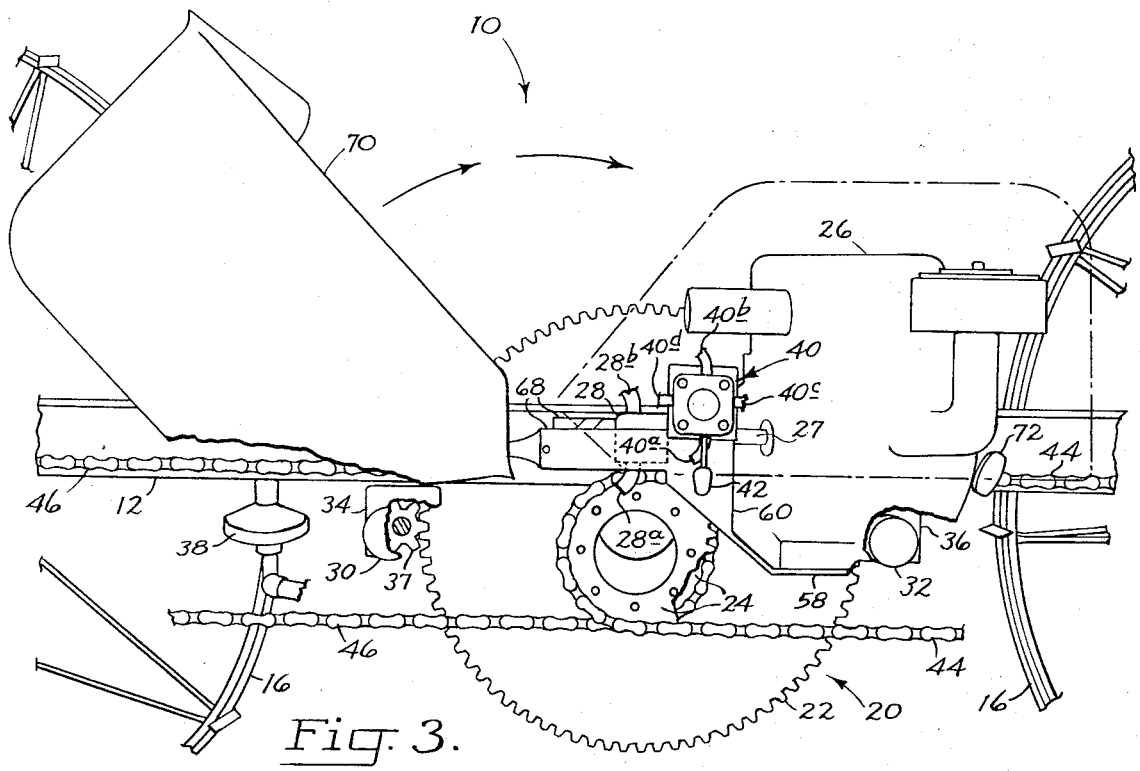
FIG. 3 is a detailed fragmentary view taken along plane 3—3 of FIG. 2.

Referring now to FIG. 3, in conjunction with FIGS. 1 and 2, mover 10 is powered by an engine 26, typically a low horsepower internal combustion engine. The engine shown in FIG. 3 is a self-contained gasoline engine, typically producing about 7 HP. Engine 26 is directly coupled by its output shaft 27 to a hydraulic pump 28 which powers hydraulic motors 30 and 32. With the organization of engine and pump shown, output shaft 27 is in direct axial alignment with the input shaft of pump 28. Motors 30 and 32 are attached to the underside of beam 12 adjacent the periphery of bull gear 22 by mounting brackets 34 and 36, respectively. As shown in FIG. 3, motor 30 is coupled to bull gear 22 through output gear 37; motor 32 is coupled to the bull gear in a similar manner.

Figure 4:
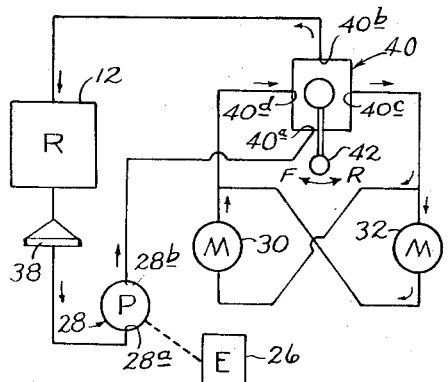
FIG. 4 is a schematic diagram illustrating the hydraulic power system of the mover.

As previously mentioned, beam 12 is hollow and serves as a reservoir for the hydraulic fluid used in the mover's hydraulic system. Referring to FIG. 4, the hydraulic system of mover 10 includes a positive displacement gear pump 28 which, as already discussed, is coupled to the output shaft 27 of engine 26. Hydraulic fluid contained in beam 12 flows through filter 38 to inlet 28a of pump 28. Hydraulic fluid under pressure is fed from outlet 28b of the pump to inlet 40a of control valve 40. Control valve 40 is a three-position valve, having a "forward", "reverse", and "off" position. When, as shown in FIG. 4, control valve handle 42 is in the "off" position, the hydraulic fluid returns directly to beam 12 through return passage 40b of the valve. When the valve handle 42 is moved to the "forward" position; i.e., clockwise in FIG. 4, the hydraulic fluid entering inlet 40a is diverted through control passage 40c, passing through motors 30 and 32 in parallel before returning to control passage 40d of the valve and returning to reservoir 12 through return passage 40b. This situation is illustrated by the fluid-flow arrows in FIG. 4. In the "reverse" position, the pressurized fluid leaves valve 40 through control passage 40d and returns through passage 40c.

Returning again to FIGS. 1-3, the wheels 16 of mover 10 are driven by drive chains 44 and 46, which link drive gears 24 with axle gears 48 and 50, respectively (FIG. 1). The latter are mounted on the axles which support the wheels in the mover. Thus, with engine 26 running, when an operator 52 moves control handle 42 of valve 40 to the "forward" or "reverse" position, power is applied to bull gear 22 by motors 30 and 32, resulting in a driving torque being transmitted to drive gears 24 and the wheel axles of the mover, as well as to the pipe extending through the gear assembly. This causes a rolling, lateral movement of the expanse of irrigation pipe.

Figure 5:
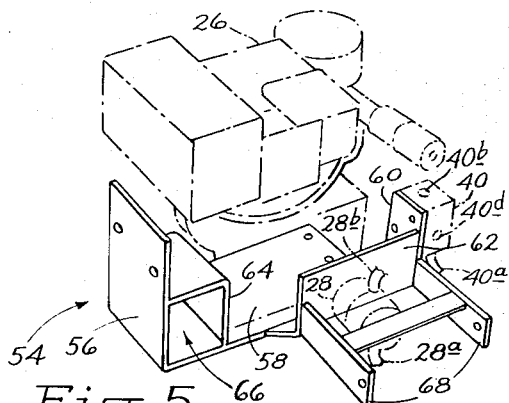
FIG. 5 is a perspective view of the mounting bracket shown in FIG. 3.

An important feature of the mover of the invention is the manner in which engine 26, pump 28, and valve 40 are mounted. In the preferred embodiment illustrated in FIG. 3, these components are attached to a common mounting bracket 54 which in turn is fastened adjacent the midregion of beam 12. As shown in FIG. 5, mounting bracket 54 includes a generally upright flange portion 56 through which the bracket is attached to beam 12, and a generally horizontal platform portion 58 which supports the underside of engine 26, shown in dot-dash outline. A second upright flange portion 60 is provided to mount control valve 40. Bracket 54 further includes a mounting portion 62 which serves to support pump 28. An inverted L-shaped portion 64 adjacent flange portion 56, in conjunction with platform 58, forms passage 66 through which chain 44 passes. Bracket 54 also includes a pair of ear portions 68 which are provided as a mounting for pivotally supporting an engine covering hood 70 (see FIG. 3).

As shown in the drawings, mounting bracket 54 is attached to beam 12 adjacent drive gears 24, and supports engine 26 to one side of and below the level of beam 12. As used herein, "below the level of" means that the underside of engine 26 is supported below the lowermost portion of beam 12. Further, bracket 54 supports control valve 40 outwardly of beam 12, adjacent the side of engine 26 which is remote from the beam. Mounting portion 62 of bracket 54 supports pump 28 so that inlet 28a of pump 28 is below the top of beam 12, and preferably at a level near the bottom of beam 12.

It will be noted, with reference to FIG. 1, that bull gear 22 is located on one side of beam 12 with drive gears 24 on the other side of the beam. Engine 26 is located outward laterally from that side of the beam where the gears 24 are located. This enables the engine to be mounted in its relatively low-level position adjacent the midregion of the beam in space which on the other side of the beam is occupied by the bull gear. Further, bracket 54 supports engine 26 outwardly of drive gears 24 so that chain 44 passes between the engine and beam 12.

The mounting arrangement above described provides a number of advantages. One of the most important of these is the reduced possibility of injury to an operator. As may be seen in FIGS. 1 and 2, the mounting location of the control valve allows operator 52 to stand outside the track of wheels 16, avoiding the possibility of injury from contact with them. Moreover, operator 52 is located well away from drive gears 24 and drive chains 44 and 46.

Another advantage accruing from the mounting arrangement described is the increased visibility provided the operator. As shown in FIG. 2, the sight path of operator 52 is not obstructed by hood 70, and the operator is afforded a view of the entire expanse of irrigation pipe.

An additional benefit of the described mounting arrangement is increased operating convenience. In FIG. 3, a handle 72 is depicted, which forms part of a recoil starting system for engine 26. In utilizing the mover, engine 26 ordinarily does not operate constantly, but only at such times when it is desired to relocate the irrigation pipe. With placement of the engine off to one side of the beam 12, and in its relatively low level position, an operator is enabled to reach handle 72 from either side of the irrigation pipe. With reference to FIG. 1, operator 52 thus is able to start the engine when positioned as shown to the right of pipe 18 in the figure, or from a position on the other side of the pipe, i.e., the left side in FIG. 1.

Still another advantage of the described organization is an increase in driving power or torque because the intake 28a of the pump is located below the fluid level in beam 12.

A final advantage flows from the mounting of the engine, pump, and valve on common mounting bracket 54; the entire unit can be removed from beam 12 in a few minutes, if necessary, for servicing, replacement, or off-season storage.

There is thus provided an improved side roll mover for irrigation pipe in which the power unit and operating controls are positioned to reduce possibility of operator injury, at the same time providing increased operating performance and convenience.

Although a preferred embodiment has been described herein, it is understood that variations and modifications are possible without departing from the spirit of the invention.

It is claimed and desired to secure by letters patent:

1. Apparatus for laterally moving an elongated expanse of pipe, comprising
   an elongated beam extending transversely of the said pipe with ends on opposite sides of said pipe,
   ground-traversing support means at said opposite ends of said beam supporting said beam for movement along the ground,
   an internal combustion engine providing power for such movement,
   means supporting said engine adjacent a midregion of said beam with the engine to one side of said beam and the base of said engine below the base of said beam,
   a pump driven by said engine,
   a hydraulic motor driven by said pump,
   valve means for controlling the output of said pump, said valve means being mounted adjacent a side of said engine remote from said beam and,
   chain means connecting said motor and said ground-traversing support means extending generally in the direction of said beam and located on the opposite side of said engine.

2. The apparatus of claim 1, wherein the engine is mounted on a bracket secured to the beam, said bracket including a platform portion supporting the base of said engine.

3. The apparatus of claim 1, wherein said beam includes an internal reservoir for hydraulic fluid for said pump, and further comprising means supporting said pump whereby the intake of said pump is below the top of said beam.

4. The apparatus of claim 1, wherein said ground-traversing support means includes an axle, said chain means drives said axle, and said chain means passes between said opposite side of said engine and said beam.

5. In a side roll mover for a pipe comprising an elongated beam extending transversely of said pipe, ground-traversing support means including an axle supporting said beam for movement along the ground, and an internal combustion engine providing power for said movement, the improvement comprising
   a mounting bracket for said engine including a flange portion attached to said beam adjacent the mid-region thereof, and a platform portion located to one side of and below the base of said beam supporting the engine to one side of said beam,
   a drive gear operatively connected to be rotated under power by operation of said engine, and
   a drive chain linking said drive gear and said axle extending in a reach disposed between said one side of said beam and said engine as located by said bracket.

6. The combination of claim 5, where said bracket further includes a mounting portion supporting a pump, said pump being driven by said engine.

7. The combination of claim 6, where said bracket further includes another flange portion, and which further comprises valve means supported on said flange portion for controlling the output of said pump, said valve means being supported by said flange portion adjacent a side of said engine remote from said beam.

8. The combination of claim 5, where said bracket further includes another mounting portion for a covering hood.

9. In a side roll mover for a pipe, which comprises an elongated beam extending transversely of said pipe, ground-traversing support means supporting the ends of said beam for movement along the ground, and an internal combustion engine providing power for said movement,
   the improvement comprising engine support means supporting the engine adjacent a mid-region of the beam with said engine located laterally to one side of and below the base of said beam, and elongated chain means operatively connecting the engine and said ground-traversing support means extending generally along the length of the beam and located on the side of said engine which faces said beam.

10. The improvement of claim 9, wherein said engine support means comprises a bracket, said bracket includes a flange portion secured to the beam and a platform portion supporting the underside of said engine.

11. The improvement of claim 10, wherein said mover further comprises a pump driven by the engine, and said bracket further includes a first mounting portion supporting said pump whereby the intake of said pump is below the top of said beam.

12. The improvement of claim 11, wherein said mover further comprises valve means for controlling the output of said pump, and said bracket further includes a second mounting portion supporting said valve means adjacent a side of said engine remote from said beam.

* * * * *